US009386373B2

(12) United States Patent
Ma et al.

(10) Patent No.: US 9,386,373 B2
(45) Date of Patent: Jul. 5, 2016

(54) SYSTEM AND METHOD FOR ESTIMATING A REVERBERATION TIME

(71) Applicant: DTS, Inc., Calabasas, CA (US)

(72) Inventors: Changxue Ma, Barrington, IL (US); Guangji Shi, San Jose, CA (US); Jean-Marc Jot, Aptos, CA (US)

(73) Assignee: DTS, INC., Calabasas, CA (US)

(*) Notice: Subject to any disclaimer, the term of this patent is extended or adjusted under 35 U.S.C. 154(b) by 209 days.

(21) Appl. No.: 13/922,472

(22) Filed: Jun. 20, 2013

(65) Prior Publication Data

US 2014/0037094 A1 Feb. 6, 2014

Related U.S. Application Data

(60) Provisional application No. 61/667,890, filed on Jul. 3, 2012.

(51) Int. Cl.
*H04B 3/20* (2006.01)
*H04R 3/02* (2006.01)
*G10L 21/0208* (2013.01)

(52) U.S. Cl.
CPC .............. *H04R 3/02* (2013.01); *G10L 21/0208* (2013.01); *G10L 2021/02082* (2013.01)

(58) Field of Classification Search
CPC ................................ H04M 9/082; H04B 3/23
USPC .................................. 381/56, 66, 83, 93, 63
See application file for complete search history.

(56) References Cited

U.S. PATENT DOCUMENTS

| | | | | |
|---|---|---|---|---|
| 7,987,095 B2 * | 7/2011 | LeBlanc | ............... | H04M 3/002 381/66 |
| 2008/0137875 A1 * | 6/2008 | Zong | ...................... | G10K 15/12 381/63 |
| 2008/0192945 A1 | 8/2008 | Mcconnell | | |
| 2008/0273708 A1 * | 11/2008 | Sandgren | ............... | G10K 15/08 381/63 |
| 2008/0292108 A1 * | 11/2008 | Buck | ........................ | H04R 3/04 381/63 |
| 2009/0117948 A1 * | 5/2009 | Buck et al. | .................... | 455/570 |

OTHER PUBLICATIONS

Eric A. Lehmann and Anders M. Johansson, “Prediction of Energy Decay in Room Impulse Responses Simulated With An Image-Source Model”; retrieved at http://www.Eric-Lehmann.com/Papers/LehJoh08Prediction.pdf; Jun. 15, 2008; Crawley WA, Australia.
M.R. Schroeder, “New Method of Measuring Reverberation Time”; Acoustical Society of America, vol. 37, Issue 3; Dec. 14, 1964; Murray Hill, New Jersey.
Stefan Goetz, Markus Kallinger, Alfred Mertins, and Karl-Dirk Kammeyer; “A Decoupled Filtered-X LMS Algorithm for Listening-Room Compensation” retrieved at http://www.isip.uni-luebeck.de/uploads/tx_ckpublications/Goetze_IWAENC2008_paper.pdf; Sep. 14-17, 2008; Bremen, Germany.

(Continued)

*Primary Examiner* — Disler Paul

(74) *Attorney, Agent, or Firm* — Craig S. Fischer; William Johnson; Joel Stoffregen

(57) ABSTRACT

A system and method for estimating a reverberation time is provided. The method includes estimating at least one room response of an audio capture environment with an acoustic echo canceller and generating an estimate of the reverberation time of the audio capture environment based on the at least one room response from the acoustic echo canceller.

14 Claims, 2 Drawing Sheets

(56) References Cited

OTHER PUBLICATIONS

Kazuo Ochiai, Takashi Araseki and Takashi Ogihara; "Echo Canceler with Two Echo Path Models"; IEEE Transactions on Communications, vol. Com-25, No. 6; Jun. 1977; New York, U.S.A.

Michael S. Brandstein and Harvey F. Silverman; "A Robust Method For Speech Signal Time-Delay Estimation In Reverberent Rooms"; IEEE Transactions on Communications, Apr. 21-24, 1997; New York, U.S.A.

Jacob Benesty and Tomas Gansler; "A Multidelay Double-Talk Detector Combined with the MDF Adaptive Filter"; Hindawi Publishing Corporation, EURASIP Journal on Applied Signal Processing 2003:11, 1056-1063; Mar. 2003; New York, U.S.A.

Changxue Ma and Guangji Shi; "Reverberation Time Estimation Based on Mulidelay AcousticEcho Cancellation"; retrieved at http://ieeexplore.ieee.org/xpls/abs_all.jsp?arnumber=6376617&tag=1; Jul. 2012; Washington DC, U.S.A.

Guangji Shi and Changxue Ma; "Subband Dereverberation Algorithm For Noisy Environments"; retrieved at http://ieeexplore.ieee.org/application/enterprise/entconfirmation.jsp?arnumber=06152462&icp=false; Jan. 12-14, 2012; Washington DC, U.S.A.

Emanuel A.P. Habets, Sharon Gannot, Israel Cohen, Piet C.W. Sommen; "Joint Dereverberation and Residual Echo Suppression of Speech Signals in Noisy Environments"; IEEE Transactions On Audio, Speech, And Language Processing, vol. 16, No. 8; Nov. 2008; New York, U.S.A.

Steven F. Boll, "Suppression of Acoustic Noise in Speech Using Spectral Subtraction"; IEEE Transactions On Audio, Speech, And Language Processing, vol. ASSP-27, No. 2; Apr. 1979; New York, U.S.A.

Gilbert A. Soulodre; "About this Dereverberation Business: A Method For Extracting Reverberation from Audio Signals"; Convention Paper 8253; Audio Engineering Society; Nov. 2010; San Francisco, U.S.A.

Robert F. Kubichek; "Standards and Technology Issues in Objective Voice Quality Assessment"; in Digital Signal Processing, pp. 38-44, vol. 1, Issue 2; Apr. 1991; Pennsylvania, U.S.A.

Jean-Marc Jot, Laurent Cerveau and Olivier Warusfel; "Analysis and Synthesis of Room Reverberation Based On A Statistical Time-Frequency Model"; retrieved at http://citeseerx.ist.psu.edu/viewdoc/summary?doi=10.1.1.52.3288; Sep. 26-29, 1997; New York, U.S.A.

International Search Report in corresponding PCT Application No. PCT/US2013/048253, mailed Nov. 26, 2013.

International Preliminary Report on Patentability in corresponding PCT Application No. PCT/US2013/048253.

International Search Report and The Written Opinion of the International Searching Authority, Or The Declaration in corresponding PCT International Application No. PCT/US2013/48253, filed Jun. 27, 2013.

Habets, E. et al. "Joint Dereverberation and Residual Echo Suppression of Speech Signals in Noisy Environments." IEEE Transactions on Audio, Speech, and Language Processing, vol. 16, No. 8, Nov. 2008. 10.1109ITASL.2008.2002071>, entire document.

Shi, G. et al. "Subband dereverberation algorithm for noisy environments." In: 2012 IEEE 8 International Conference on Emerging Signal Processing Applications. Las Vegas, NV, USA. Jan. 12-14, 2012. <DOI: 10.1109/ ESPA.2012.6152462> ISBN: 978-1-4673-0899-1, pp. 127-130.

Ma, C. et al. "Reverberation time estimantion based on multidelay acoustic echo cancellation." In: Jan. 18, 2012 International Conference on Audio, Language, and Image Processing (ICALIP). Shanghai, China. Jul. 16-18, 2012. <DOI:10.110911CALIP.2012.6376617>, ISBN: 978-1-4673-0173-2. pp. 230-234.

* cited by examiner

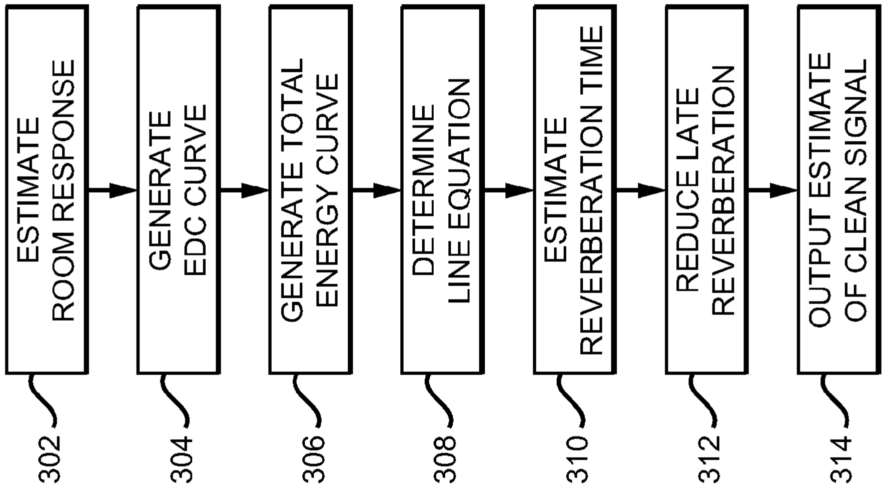
*FIG. 3*
*FIG. 1*
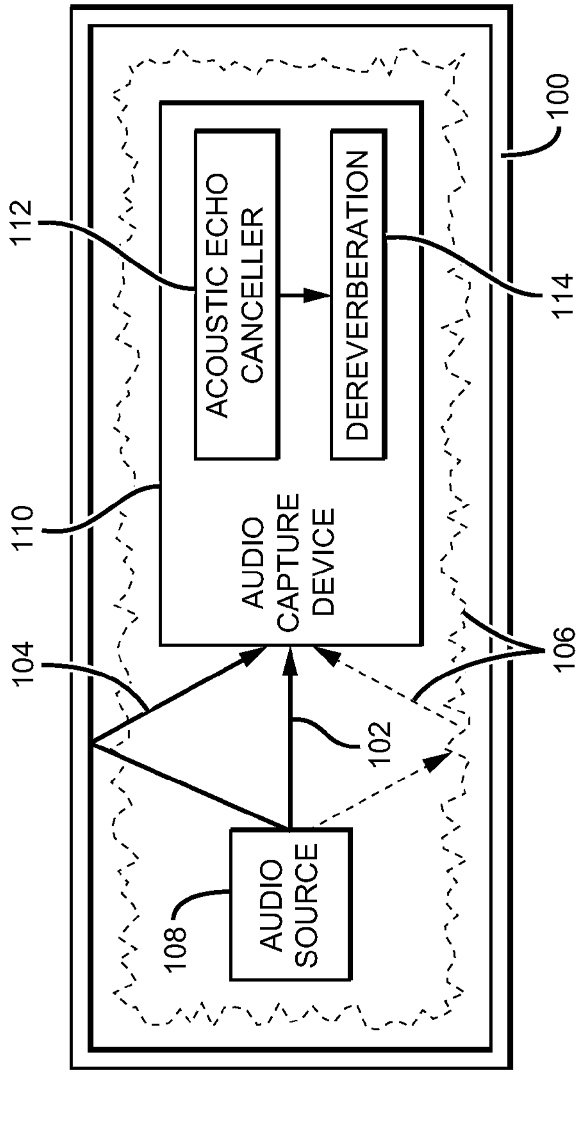

SYSTEM AND METHOD FOR ESTIMATING A REVERBERATION TIME

CROSS-REFERENCE TO RELATED APPLICATIONS

This application claims priority to application No. 61/667,890, filed Jul. 3, 2012.

BACKGROUND

1. Technical Field

The present invention relates to systems and methods for reducing the reverberation in a captured audio signal, in particular by estimating a reverberation time of the capture environment.

2. Description of the Related Art

A number of techniques have been proposed in the past for de-reverberation. These methods include multi-channel approaches and single channel approaches. A common single channel de-reverberation approach is spectral subtraction. Prior publications on spectral subtraction include "About this dereverberation business: A method for extracting reverberation from audio signals," *Proceedings of* 129*th Convention*, Nov. 4-7, 2010, by G. A. Soulodre; "Subband dereverberation algorithm for noisy environments," *IEEE International Conference on Emerging Signal Processing Applications*, January 2012, by Guangji Shi and Changxue Ma; "Joint dereverberation and residual echo suppression of speech signals in noisy environments," *IEEE Transactions on Audio, Speech, and Language Processing*, Vol. 16, Issue 8, pp. 1433-1451, November 2008, by E. A. P. Habets, S. Gannot, I. Cohen, and P. C. W. Sommen; "A decoupled filtered-X LMS algorithm for listening room compensation," *Proceedings of IWAENC*, 2008, by Stefan Goetze, Markus Kallinger, Alfred Mertins, and Karl-Dirk Kammeyer; and "Analysis and Synthesis of Room Reverberation Based on a Statistical Time-Frequency Model," 103*rd Conv. Audio Engineering Society*, September 1997, by Jean-Marc Jot, Laurent Cerveau, and Olivier Warusfel.

In these types of approaches, an impulse response for a reverberant environment is modeled as a discrete random process with exponential decay. These approaches may be extended by estimating the magnitude of the impulse response using a minimum ratio of the magnitude of a current frequency block to that of a previous frequency block. The reverberant signal may then be removed using spectral subtraction-based algorithms such as in the publications by Shi and Habets.

In de-reverberation, it is important to have a good estimate of the reverberation time. This helps to ensure that spectral subtraction-based de-reverberation works well with reverberant audio signals. Inaccurate estimation of reverberation time may lead to over-subtraction of late reverberation and generate annoying artifacts such as music noise.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In certain embodiments, a method is provided for attenuating reverberation in a reverberant audio signal, wherein the method is executed by a physical data processor. The method includes estimating at least one room response of the audio capture environment; generating an energy decay curve from the at least one estimated room response; generating an estimate of the reverberation time of the audio capture environment based on the energy decay curve; generating a clean audio signal by applying a spectral subtraction-based algorithm to the reverberant audio signal; and outputting the clean audio signal. The spectral subtraction-based algorithm utilizes the estimated reverberation time.

Additionally, in certain embodiments, the at least one room response is estimated by an acoustic echo canceller. In certain embodiments, the at least one room response is estimated by a multi-delay block frequency-domain adaptive filter. In certain embodiments, the energy decay curve is generated for a plurality of frequency subbands, and the estimate of the reverberation time includes reverberation times corresponding to each of the plurality of frequency subbands. In certain embodiments, generating an estimate of the reverberation time includes generating a total energy curve; selecting a segment of the energy decay curve based on the total energy curve; and determining a line equation corresponding to the selected segment of the energy decay curve. The estimate of the reverberation time of the audio capture environment is based on the line equation. In certain embodiments, the method further includes extending the selected segment of the energy decay curve to a predetermined point lower than the maximum energy of the energy decay curve. The selected segment is extended based on the line equation, and the estimate of the reverberation time of the audio capture environment is the time corresponding to the predetermined point lower than the maximum energy. In certain embodiments, the at least one room response of the capture environment is estimated based on natural sounds from an audio source.

Additionally, in certain embodiments, the spectral subtraction-based algorithm includes filtering the reverberant audio signal with a spectral subtraction filter in the frequency domain, wherein the spectral subtraction filter is $$G(k, \omega) = \sqrt{\frac{P_{XX}(k, \omega) - P_{RR}(k, \omega)}{P_{XX}(k, \omega)}},$$

where $P_{XX}$ is the power spectral density (PSD) of the reverberant audio signal, $P_{RR}$ is the PSD of a late reverberation component of the reverberant audio signal, k is the time index, and ω is the frequency index, and wherein $$P_{RR}(k,\omega)=e^{-2\Delta T}P_{XX}(k-N,\omega),$$

where $P_{XX}(k-N,\omega)$ is the power spectrum of the reverberant signal N frames back, T is the early reflection time, N is the early reflection time in frames, and Δ is linked to the reverberation time $R_T$ through $$\Delta = \frac{3\ln 10}{R_T}.$$

In certain embodiments, a method is provided for estimating a reverberation time, wherein the method is executed by a physical data processor. The method includes estimating at least one room response of an audio capture environment with an acoustic echo canceller; and generating an estimate of the reverberation time of the audio capture environment based on the at least one room response from the acoustic echo canceller.

Additionally, in certain embodiments, the method further includes generating an energy decay curve from the at least one estimated room response based on the at least one room response from the acoustic echo canceller, wherein the estimate of the reverberation time of the audio capture environment based on the energy decay curve. In certain embodiments, the acoustic echo canceller includes a multi-delay block frequency-domain adaptive filter for estimating the at least one room response of audio capture environment. In certain embodiments, the energy decay curve is generated for a plurality of frequency subbands, and the estimate of the reverberation time includes reverberation times corresponding to each of the plurality of frequency subbands. In certain embodiments, the method further includes generating a total energy curve; selecting a segment of the energy decay curve based on the total energy curve; and determining a line equation corresponding to the selected segment of the energy decay curve. The estimate of the reverberation time of the audio capture environment is based on the line equation. In certain embodiments, the method further includes extending the selected segment of the energy decay curve to a predetermined point lower than the maximum energy of the energy decay curve. The selected segment is extended based on the line equation, and the estimate of the reverberation time of the audio capture environment is the time corresponding to the predetermined point lower than the maximum energy. In certain embodiments, the at least one room response of the capture environment is estimated based on natural sounds from an audio source.

In certain embodiments, a system is provided for estimating a reverberation time. The system includes an acoustic echo canceller configured to estimate at least one room response of an audio capture environment; and a dereverberation module configured to receive the at least one room response from the acoustic echo canceller, and configured to generate an estimate of the reverberation time of the audio capture environment based on the at least one room response.

Additionally, in certain embodiments, the acoustic echo canceller includes a multi-delay block frequency-domain adaptive filter for estimating the at least one room response of audio capture environment. In certain embodiments, the acoustic echo canceller estimates the at least one room response of the capture environment based on natural sounds from an audio source.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 illustrates an example of a capture environment;

FIG. 3 illustrates a method of estimating a reverberation time.

DETAILED DESCRIPTION

Figure 2:
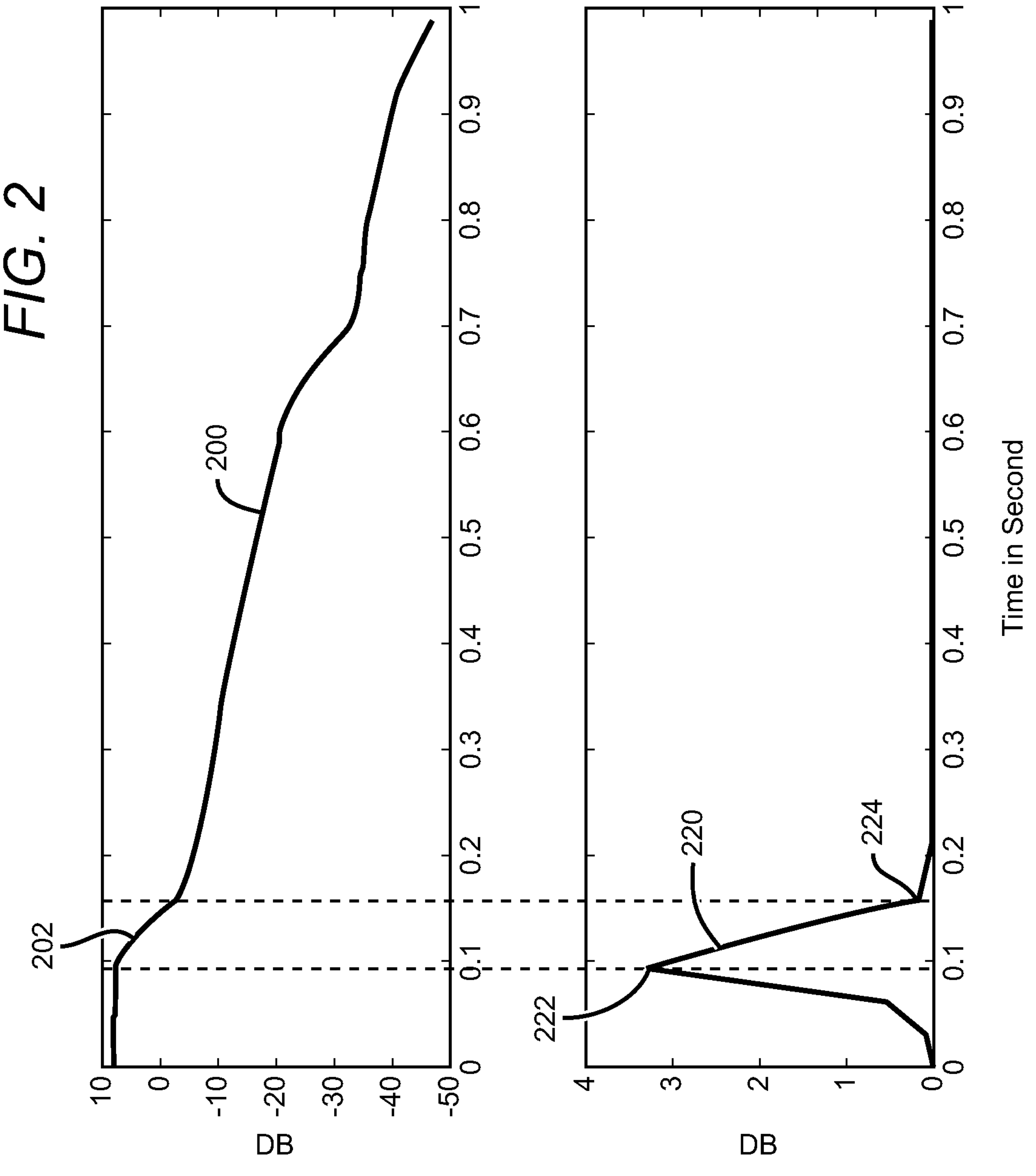
FIG. 2 illustrates an example of an energy decay curve and an example of a total energy curve of a spectra sequence.

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

The present invention concerns processing audio signals, which is to say signals representing physical sound. These signals are represented by digital electronic signals. In the discussion which follows, analog waveforms may be shown or discussed to illustrate the concepts; however, it should be understood that typical embodiments of the invention will operate in the context of a time series of digital bytes or words, said bytes or words forming a discrete approximation of an analog signal or (ultimately) a physical sound. The discrete, digital signal corresponds to a digital representation of a periodically sampled audio waveform. As is known in the art, for uniform sampling, the waveform must be sampled at a rate at least sufficient to satisfy the Nyquist sampling theorem for the frequencies of interest. For example, in a typical embodiment a uniform sampling rate of approximately 44.1 thousand samples/second may be used. Higher sampling rates such as 96 khz may alternatively be used. The quantization scheme and bit resolution should be chosen to satisfy the requirements of a particular application, according to principles well known in the art. The techniques and apparatus of the invention typically would be applied interdependently in a number of channels. For example, it could be used in the context of a "surround" audio system (having more than two channels).

As used herein, a "digital audio signal" or "audio signal" does not describe a mere mathematical abstraction, but instead denotes information embodied in or carried by a physical medium capable of detection by a machine or apparatus. This term includes recorded or transmitted signals, and should be understood to include conveyance by any form of encoding, including pulse code modulation (PCM), but not limited to PCM. Outputs or inputs, or indeed intermediate audio signals could be encoded or compressed by any of various known methods, including MPEG, ATRAC, AC3, or the proprietary methods of DTS, Inc. as described in U.S. Pat. Nos. 5,974,380; 5,978,762; and 6,487,535. Some modification of the calculations may be required to accommodate that particular compression or encoding method, as will be apparent to those with skill in the art.

The present invention may be implemented in a consumer electronics device, such as an audio/video device, a gaming console, a mobile phone, a conference phone, a VoIP device, or the like. A consumer electronic device includes a Central Processing Unit (CPU) or programmable Digital Signal Processor (DSP) which may represent one or more conventional types of such processors, such as an IBM PowerPC, Intel Pentium (x86) processors, and so forth. A Random Access Memory (RAM) temporarily stores results of the data processing operations performed by the CPU or DSP, and is interconnected thereto typically via a dedicated memory channel. The consumer electronic device may also include permanent storage devices such as a hard drive, which are also in communication with the CPU or DSP over an I/O bus. Other types of storage devices such as tape drives, optical disk drives may also be connected. Additional devices such as printers, microphones, speakers, and the like may be connected to the consumer electronic device.

The consumer electronic device may execute one or more computer programs. Generally, the operating system and computer programs are tangibly embodied in a computer-readable medium, e.g. one or more of the fixed and/or removable data storage devices including the hard drive. The computer programs may be loaded from the aforementioned data storage devices into the RAM for execution by the CPU or DSP. The computer programs may comprise instructions which, when read and executed by the CPU or DSP, cause the same to perform the steps to execute the steps or features of the present invention.

The present invention may have many different configurations and architectures. Any such configuration or architecture may be readily substituted without departing from the scope of the present invention. A person having ordinary skill in the art will recognize the above described sequences are the most commonly utilized in computer-readable mediums, but there are other existing sequences that may be substituted without departing from the scope of the present invention.

Elements of one embodiment of the present invention may be implemented by hardware, firmware, software or any combination thereof. When implemented as hardware, the present invention may be employed on one audio signal processor or distributed amongst various processing components. When implemented in software, the elements of an embodiment of the present invention are essentially the code segments to perform the necessary tasks. The software preferably includes the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The “processor readable or accessible medium” or “machine readable or accessible medium” may include any medium that can store, transmit, or transfer information.

Examples of the processor readable medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term “data” here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

One embodiment of the invention may be described as a process which is usually depicted as a flowchart, a flow diagram, a structure diagram, or a block diagram. Although a block diagram may describe the operations as a sequential process, many of the operations can be performed in parallel or concurrently. In addition, the order of the operations may be re-arranged. A process is terminated when its operations are completed. A process may correspond to a method, a program, a procedure, etc.

FIG. 1 illustrates an example of a capture environment 100, according to a particular embodiment. The room response of the capture environment 100 is modeled as three components: a direct sound component 102, an early reflection component 104, and a late reverberation component 106. The direct sound component 102 includes sound pressure waves that flow directly from an audio source 108 to an audio capture device 110. The audio source 108 may be, for example, a loudspeaker. The audio capture device 110 may be, for example, a microphone. While the audio source 108 and the audio capture device 110 are shown as separate boxes in FIG. 1, they may be contained in one device, such as a conference telephone.

The early reflection component 104 includes sound pressure waves that arrive at the audio capture device 110 after the direct sound component 102. The early reflection component 104 typically includes sound pressure waves that have reflected off one or two surfaces in the capture environment 100. The late reverberation component 106 includes sound pressure waves that arrive at the audio capture device 110 after the early reflection component. The late reverberation component 106 typically includes sound pressure waves that have reflected off many surfaces in the capture environment 100.

The late reverberation component 106 is an important factor for de-reverberation. In a generic reverberation model, the direct sound component 102 and early reflection component 104 are determined by the position of the audio source 108 and the audio capture device 110. However, the late reverberation component 106 is assumed to be less dependent on the relative positions of the audio source 108 and audio capture device 110. Instead, the late reverberation component 106 is modeled statistically using the reverberation time of the capture environment 100. Therefore, in accordance with a particular embodiment, the reverberation time of the late reverberation component 106 is estimated from the room response of the capture environment 100. The room response is an estimate of the impulse response of the capture environment 100. The room response is estimated using information from a multi-delay acoustic echo canceller 112. While shown in FIG. 1 as a component of the capture device 110, the multi-delay acoustic echo canceller 112 may alternatively be located in the audio source 108, or in a separate device in the capture environment 100. The acoustic echo canceller 112 transmits the estimated room response information to a dereverberation module 114. The dereverberation module 114 processes the audio signals received by the audio capture device 110 to substantially reduce reverberation.

Conventional systems for reducing reverberation obtain an estimated reverberation time of a capture environment by playing and capturing a pre-configured test signal. This test signal may include a frequency sweep, a “chirp” signal, or a high-amplitude transient signal. However, in the present system, a pre-configured test signal is not necessary. Instead, the dereverberation module 114 uses estimated room response information from the multi-delay acoustic echo canceller 112 to estimate the reverberation time of the capture environment 100. The multi-delay acoustic echo canceller 112 generates the estimated room response using only the sounds that are typically rendered through the audio source 108, such as speech, music, or other natural sounds.

During conference calls, voice command and control, or other real-time audio applications, a far-end signal x(n) (where n is the sample index) rendered through the audio source 108 may feed back into the near-end audio capture device to generate an echo. The captured audio signal y(n) may include the near-end source signal and the echo signals, which may be modeled as the original source signal x(n) convolved with the room response of the capture environment 100. An adaptive filter is estimated to approximate the room response such that $$e(n) = y(n) - \sum_{k=0}^{N-1} x(n-k)h(k)$$

where e(n) is an error signal and h(k) represents the estimated room response of the capture environment 100.

The estimated room response of the capture environment 100 may include estimates from multiple loudspeakers if they are present in the environment, such that h(k) includes $h_1(k) \ldots h_M(k)$. These multiple estimates may be used together to estimate the total room response of the environment 100.

The above adaptive filter may be implemented as a multi-delay block frequency-domain adaptive filter. The filter coefficients are divided into blocks and updated block by block in the frequency-domain with a Fast Fourier Transform (FFT). With a block size of M samples, n=mM+j and for h(k), k=kM+j where k=0, . . . K−1 such that KM=N, the above equation becomes:

$$e(mM+j) = y(mM+j) - \sum_{k=0}^{K-1} \sum_{p=0}^{M-1} x((m-k)M+j-p)h(kM+p).$$

This equation may then be converted into the frequency-domain by applying a Fast Fourier Transformation F to the Vectors, resulting in:

$$\overline{e}_f(m) = \overline{y}_f(m) - G_{01}^T \sum_{k=0}^{K-1} D_{m-k}\overline{h}_k$$

where $$G_{01} = FW^{01}F^{-1} G_{10} = FW^{10}F^{-1}$$

$$W^{01} = \begin{pmatrix} I_{M\times M} & 0 \\ 0 & 0_{M\times M} \end{pmatrix}$$

$$W^{10} = \begin{pmatrix} 0_{M\times M} & 0 \\ 0 & I_{M\times M} \end{pmatrix}$$

$$\vec{\hat{h}}_k(m) = \vec{\hat{h}}_k(m-1) + u(1-\lambda)G^{10}D(m-k)S(m)^{-1}\hat{e}(m)$$

and where $\hat{\vec{h}}_k(m)$ is the FFT of the kth block of the estimated impulse response of the capture environment 100.

$$S(m) = \lambda S(m-1) + (1-\lambda) * D^*(m)D(m)$$

$$D(m) = \sum_{j=0}^{2*M-1} x(m*M+j)e^{-2\pi ijm/(2*M)}$$

where λ and μ are constants, with 0<μ<2 and 0<λ<1 to control the update rate. The above equations result in a two-echo path model. The foreground filter may be updated while there is no double-talk detected.

The publication "Analysis and Synthesis of Room Reverberation Based on a Statistical Time-Frequency Model," 103rd Conv. Audio Engineering Society, September 1997, by Jot et al., incorporated herein by reference, describes a time-frequency analysis procedure for deriving the time-frequency envelope of the late reverberation 106 from a measured impulse response. This procedure implements an "Energy Decay Curve" (EDC) with an improved calculation accuracy:

$$EDC(t) = \langle h(t)^2 \rangle \frac{R_T}{6*\ln(10)}$$

where $\langle h(t)^2 \rangle$ represents the energy envelope of an impulse response and t represents time. The energy decay curve (EDC) can also be obtained from the Schroeder integral by $$EDC(t) = \int_t^\infty h(\tau)^2 d\tau.$$

In accordance with a particular embodiment, an EDC is generated from the estimated room response obtained from the acoustic echo canceller 112. The reverberation time $R_T$ is then determined by estimating the time it takes for the EDC to drop by 60 dB from its initial energy level. The EDC curve, as used to derive the $R_T$ estimate, is calculated as $$EDC(p) = \Sigma_p^\infty \|\hat{h}_k(m)\|$$

where p is the block index. As described above, the estimated room response of the capture environment 100 is represented as blocks in the frequency-domain, which resemble tiles of a time-frequency analysis. Therefore, in a particular embodiment, the reverberation time $R_T$ is estimated as a function of frequency. Performing the reverberation time estimate in the frequency domain may allow $R_T$ to be computed more efficiently.

FIG. 2 illustrates an example of an EDC curve 200 and an example of a total energy curve 220 of the spectra sequence $\|\hat{\vec{h}}_k(m)\|$. The total energy curve 220 is generated from the estimated room response obtained from the acoustic echo canceller 112. The estimated room response generated by the acoustic echo canceller 112 includes a number of blocks (or frames) of samples. For example, the acoustic echo canceller 112 may have a filter length of 4096 samples and utilize blocks of 256 samples, resulting in 16 blocks. The total energy curve is generated by calculating the energy for each sample in a block, and then summing all of the energy values in the block together. Then the total energy curve 220 is computed by determining the total energy remaining in the estimated room response at time t.

The total energy curve 220 may be used to estimate the time when the direct component 102 and early reflection component 104 are received by the audio capture device 110. The peak 222 of the total energy curve 220 corresponds with the time that the direct component 102 is received by the capture device 110. The inflection point 224 corresponds with the time that the early reflection component 104 ends. These times may then be translated to the EDC curve 200 as shown by the dashed lines in FIG. 2. A line equation for the EDC curve segment 202 between the two dashed lines is then determined by calculating an equation for a line that crosses the two intersection points. Using the line equation, the EDC curve segment 202 may be extended to a point 60 dB lower than the maximum energy of the EDC curve 200. The time corresponding to the 60 dB point may then be used as the reverberation time $R_T$.

The late reverberation 106 (r(t)) of the estimated room response of the capture environment 100 may be modeled as:

$$r(t) = \begin{cases} b(t)e^{-\Delta t}, & t \geq 0 \\ 0, & \text{otherwise} \end{cases}$$

where b(t) is a zero-mean Gaussian stationary noise, and Δ is linked to the reverberation time $R_T$ through $$\Delta = \frac{3\ln 10}{R_T}.$$

The autocorrelation of a reverberant signal x(t) at time t can be expressed as the sum of the autocorrelation of the late reverberation signal r(t) and the autocorrelation of the direct signal s(t) (including a few early reflections). That is, $$E[x(t)x(t+\tau)]=E[r(t)r(t+\tau)]+E[s(t)s(t+\tau)]$$

where $$E[r(t)r(t+\tau)]=e^{-2\Delta T}E[x(t-T)x(t-T+\tau)].$$

In the frequency domain, the above equation becomes $$P_{XX}(k,\omega)=P_{SS}(k,\omega)+P_{RR}(k,\omega)$$

Where $P_{XX}$ is the power spectral density (PSD) of the reverberant signal, $P_{XX}$ is the PSD of the direct signal, $P_{RR}$ is the PSD of the late reverberation, k is the time index, and ω is the frequency index.

The estimated clean signal is generated using a spectral subtraction-based algorithm. A spectral subtraction-based algorithm is an algorithm that utilizes a spectral subtraction filter. The spectral subtraction filter is generated by removing undesirable components (such as noise or reverberation) from desirable components by performing a subtraction operation in the frequency domain. The spectral subtraction filter is then used by the spectral subtraction-based algorithm to filter a signal having the same undesirable components and generate a clean signal.

In the frequency domain, the estimated clean signal S(k,ω) is expressed as a spectral subtraction-based algorithm with the form $$S(k,\omega)=G(k,\omega)X(k,\omega),$$

where the spectral subtraction filter is the de-reverberation gain G(k, ω).

$$G(k,\omega) = \sqrt{\frac{P_{XX}(k,\omega) - P_{RR}(k,\omega)}{P_{XX}(k,\omega)}},$$

where $P_{RR}(k,\omega)=e^{-2\Delta T}P_{XX}(k-N,\omega)$, T is the early reflection time, and N is the early reflection time in frames. $P_{XX}(k-N,\omega)$ is the power spectrum of the reverberant signal N frames back. The power spectrum of the reverberant signal is estimated through a running average $$P_{XX}(k,\omega)=\alpha P_{XX}(k-1,\omega)+(1-\alpha)|X(k,\omega)|^2$$

where α is value ranging from 0 to 1, and $|X(k,\omega)|^2$ is the current power spectrum estimate at time k and frequency ω.

The de-reverberation gain G(k, ω) is the spectral subtraction filter in the spectral subtraction-based algorithm. In accordance with a preferred embodiment, G(k, ω) includes a subtraction of late reverberation components ($P_{RR}$) from the reverberant signal components ($P_{XX}$) in the frequency domain. When the de-reverberation gain G(k, ω) is applied to a reverberant input signal X(k, ω), the result is an estimate of the clean (direct) input signal S(k, ω) with the reverberation substantially removed. The accuracy of the estimate of the clean input signal S(k, ω) is partly dependent on the estimate of the reverberation time of the environment $R_T$. With an accurate estimate of $R_T$, spectral subtraction-based algorithms may result in a reverberation tail that is significantly reduced. The reverberation time $R_T$ is a key parameter to ensure the performance of the de-reverberation results.

FIG. 3 illustrates a method of estimating the reverberation time $R_T$, according to a particular embodiment. In step 302, a room response of the capture environment 100 is estimated. In accordance with a particular embodiment, the room response is estimated using the multi-delay block frequency-domain adaptive filter in an acoustic echo canceller, as described above. Alternatively, the room response of the capture environment 100 may be estimated using other measurement and analysis methods.

In step 304, the estimated room response of the capture environment 100 is used to generate an EDC curve, as described above. The estimated room response of the capture environment 100 may also be used to generate a total energy curve in step 306.

In step 308, a line equation for a segment of the EDC curve is calculated. In accordance with a particular embodiment, the total energy curve generated in step 306 is used to determine the segment of the EDC curve for which the line equation is calculated, as described above.

In step 310, the reverberation time $R_T$ is estimated by extending the segment of the EDC curve using the line equation, as described above. The reverberation time $R_T$ corresponds with the time where the energy of the extended segment line has dropped 60 dB from the maximum energy.

In step 312, the reverberation time $R_T$ is used to reduce the late reverberation 106 of the capture environment 100. In accordance with a particular embodiment, a spectral subtraction-based algorithm is used to perform the de-reverberation. The spectral subtraction-based algorithm utilizes the estimated reverberation time $R_T$ to increase the accuracy of the de-reverberation. The spectral subtraction-based algorithm applies a de-reverberation gain to a reverberant input signal to generate an estimate of the direct input signal with the reverberation substantially reduced.

After reverberation has been reduced, the estimate of the direct input signal may be output, as shown in step 314. The estimate of the direct input signal may be reproduced, transmitted, and/or stored for later reproduction. When the estimate of the direct input signal is reproduced using, for example, a loudspeaker or headphones, the resulting sound may sound "dryer" and have less reverberation.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A method for attenuating reverberation in a reverberant audio signal, wherein the method is executed by a physical data processor, the method comprising:

estimating at least one room response of the audio capture environment by an acoustic echo canceller using the reverberant audio signal;

generating an energy decay curve from the at least one estimated room response;

generating an estimate of the reverberation time of the audio capture environment based on the energy decay curve, comprising:

generating a total energy curve;

selecting a segment of the energy decay curve based on the total energy curve; and determining a line equation corresponding to the selected segment of the energy decay curve, wherein the estimate of the reverberation time of the audio capture environment is based on the line equation;

generating a clean audio signal by applying a spectral subtraction-based algorithm to the reverberant audio signal, wherein the spectral subtraction-based algorithm utilizes the estimated reverberation time; and outputting the clean audio signal.

2. The method of claim 1, wherein the acoustic echo canceller includes a multi-delay block frequency-domain adaptive filter for estimating the at least one room response of the audio capture environment.

3. The method of claim 1, wherein the energy decay curve is generated for a plurality of frequency subbands, and the estimate of the reverberation time includes reverberation times corresponding to each of the plurality of frequency subbands.

4. The method of claim 1, further comprising:

extending the selected segment of the energy decay curve to a predetermined point lower than the maximum energy of the energy decay curve;

wherein the selected segment is extended based on the line equation; and wherein the estimate of the reverberation time of the audio capture environment is the time corresponding to the predetermined point lower than the maximum energy.

5. The method of claim 1, wherein the at least one room response of the capture environment is estimated based on natural sounds from an audio source.

6. The method of claim 1, wherein the spectral subtraction-based algorithm comprises:

filtering the reverberant audio signal with a spectral subtraction filter in the frequency domain, wherein the spectral subtraction filter is:

$$G(k,\omega)=\sqrt{\frac{P_{XX}(k,\omega)-P_{RR}(k,\omega)}{P_{XX}(k,\omega)}},$$

$P_{XX}$ is the power spectral density (PSD) of the reverberant audio signal, $P_{RR}$ is the PSD of a late reverberation component of the reverberant audio signal, k is the time index, and ω is the frequency index, and wherein $P_{RR}(k,\omega)=e^{-2\Delta T}P_{XX}(k-N,\omega)$, where $P_{XX}(k-N,\omega)$ is the power spectrum of the reverberant signal N frames back, T is the early reflection time, N is the early reflection time in frames; and Δ is linked to the reverberation time $R_T$ through $$\Delta=\frac{3\ln 10}{R_T}.$$

7. A method for estimating a reverberation time, wherein the method is executed by a physical data processor, the method comprising:

estimating at least one room response of an audio capture environment with an acoustic echo canceller;

generating an energy decay curve based on the at least one room response from the acoustic echo canceller; and generating an estimate of the reverberation time of the audio capture environment based on the energy decay curve, comprising:

generating a total energy curve;

selecting a segment of the energy decay curve based on the total energy curve; and determining a line equation corresponding to the selected segment of the energy decay curve, wherein the estimate of the reverberation time of the audio capture environment is based on the line equation.

8. The method of claim 7, wherein the acoustic echo canceller includes a multi-delay block frequency-domain adaptive filter for estimating the at least one room response of audio capture environment.

9. The method of claim 7, wherein the energy decay curve is generated for a plurality of frequency subbands, and the estimate of the reverberation time includes reverberation times corresponding to each of the plurality of frequency sub bands.

10. The method of claim 7, further comprising:

extending the selected segment of the energy decay curve to a predetermined point lower than the maximum energy of the energy decay curve;

wherein the selected segment is extended based on the line equation; and wherein the estimate of the reverberation time of the audio capture environment is the time corresponding to the predetermined point lower than the maximum energy.

11. The method of claim 7, wherein the at least one room response of the capture environment is estimated based on natural sounds from an audio source.

12. A system for estimating a reverberation time, comprising:

an acoustic echo canceller configured to estimate at least one room response of an audio capture environment; and a dereverberation module configured to receive the at least one room response from the acoustic echo canceller, and configured to:

generate an energy decay curve based on the at least one room response from the acoustic echo canceller; and generate an estimate of the reverberation time of the audio capture environment based on the energy decay curve, comprising:

generating a total energy curve;

selecting a segment of the energy decay curve based on the total energy curve; and determining a line equation corresponding to the selected segment of the energy decay curve, wherein the estimate of the reverberation time of the audio capture environment is based on the line equation.

13. The system of claim 12, wherein the acoustic echo canceller includes a multi-delay block frequency-domain adaptive filter for estimating the at least one room response of audio capture environment.

14. The system of claim 12, wherein the acoustic echo canceller estimates the at least one room response of the capture environment based on natural sounds from an audio source.

* * * * *